United States Patent
Hori (12) 
(10) Patent No.: US 6,259,993 B1
(45) Date of Patent: Jul. 10, 2001

(54) OPTICAL FIBER CHARACTERISTIC EVALUATION SYSTEM AND COMPUTER-READABLE RECORDING MEDIUM ON WHICH COMPUTER PROGRAM USED FOR THE SYSTEM IS RECORDED

(75) Inventor: Shigeo Hori, Atsugi (JP)

(73) Assignee: Anritsu Corporation, Tokyo (JP)

( * ) Notice: Subject to any disclaimer, the term of this patent is extended or adjusted under 35 U.S.C. 154(b) by 0 days.

(21) Appl. No.: 09/160,603

(22) Filed: Sep. 25, 1998

(30) Foreign Application Priority Data

Oct. 9, 1997 (JP) .................................................. 9-293513

(51) Int. Cl.[7] ............................. G06F 19/00; G01N 21/00
(52) U.S. Cl. ............................................. 702/30; 356/73.1
(58) Field of Search .............................. 356/73.1; 702/30

(56) References Cited

U.S. PATENT DOCUMENTS

| | | |
|---|---|---|
| 5,528,356 | 6/1996 | Harcourt . |
| 5,867,807 * | 2/1999 | Yamada et al. ........................ 702/30 |
| 5,963,313 * | 10/1999 | Anderson ............................ 356/73.1 |

FOREIGN PATENT DOCUMENTS 44 11 407 A1    10/1995   (DE) .

* cited by examiner

Primary Examiner—John S. Hilten
Assistant Examiner—Mylinh T Tran
(74) Attorney, Agent, or Firm—Frishauf, Holtz, Goodman, Langer & Chick, P.C.

(57) ABSTRACT

A data storage section stores a plurality of characteristic data obtained by measuring one optical fiber a plurality of number of times at time intervals or a plurality of characteristic data obtained by measuring a plurality of optical fibers. The output unit displays the waveforms of the plurality of characteristic data. A waveform display control section causes the output unit to display the waveforms of the plurality of characteristic data on the orthogonal coordinate plane defined by a distance axis and a characteristic value axis. A reference point designating section designates an arbitrary reference point within the orthogonal coordinate plane. A calculating section calculates the difference between the characteristic value axis coordinate value of the reference point designated by the reference point designating section and the characteristic value axis coordinate value of each of the characteristic data at a distance axis coordinate value nearly equal to the distance axis coordinate value of the reference point. An offset section offsets the characteristic data in the characteristic value axis direction.

9 Claims, 9 Drawing Sheets

OPTICAL FIBER CHARACTERISTIC EVALUATION SYSTEM AND COMPUTER-READABLE RECORDING MEDIUM ON WHICH COMPUTER PROGRAM USED FOR THE SYSTEM IS RECORDED

BACKGROUND OF THE INVENTION

The present invention relates to an optical fiber characteristic evaluation system for evaluating the transmission characteristics of many optical fibers forming optical transmission lines in a communication system or the like, and a computer-readable recording medium on which a computer program used for the system is recorded.

Recently, optical fibers have been widely used as signal transmission lines in communication systems and the like in place of conventional metal lines.

To lay and manage such optical fibers, a test on an optical fiber transmission line and evaluation of the test result must be periodically performed.

Assume that one optical fiber includes a plurality of optical fibers connected in series.

Figure 10:
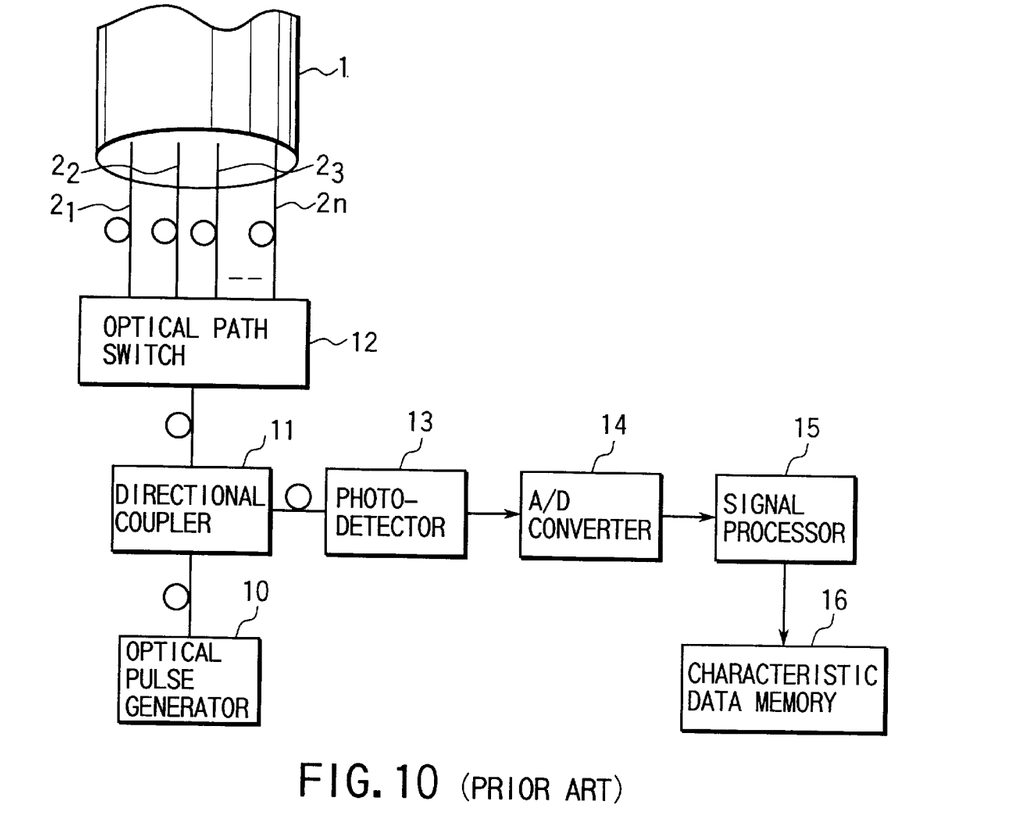
FIG. 10 is a block diagram showing the schematic arrangement of an OTDR used for conventional optical fiber characteristic evaluation.

Conventionally, optical fibers are tested by using an optical time-domain reflectometer (OTDR) like the one shown in FIG. 10.

In this OTDR, an optical pulse from an optical pulse generator 10 is input to one end of one of optical fibers $2_1$ to $2_n$ of an optical multi-fiber cable 1 through a directional coupler 11 and an optical path switch 12, and a photodetector 13 detects the intensity of light (backward scattered light or reflected light) returning to the one end side of the optical fiber. An A/D converter 14 then converts the photodetection signal output from the photodetector 13 into a data signal, and inputs it to a signal processor 15. The signal processor 15 processes a series of data signals until a predetermined period of time elapses after the incident timing of the optical pulse, and stores the distance versus received light intensity characteristic data in a characteristic data memory 16.

After the characteristic data of the optical fiber forming one transmission line are acquired, the optical path switch 12 is switched to connect another optical fiber to the directional coupler 11, thus storing the characteristic data of the optical fibers $2_1$ to $2_n$ in the characteristic data memory 16.

Figure 11:
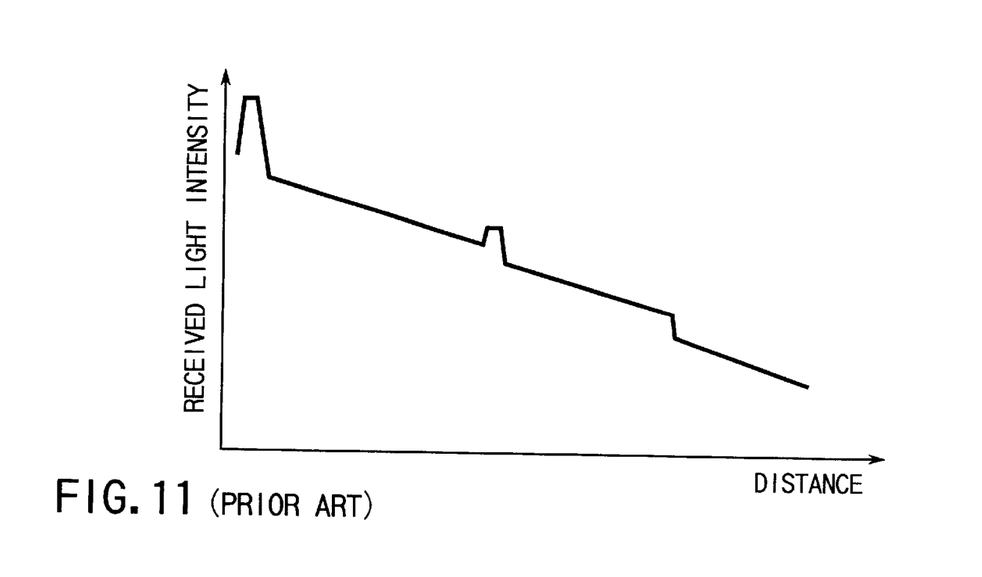
FIG. 11 is a graph showing a display example of characteristic data in conventional optical fiber characteristic evaluation.

The transmission characteristics of each optical fiber are evaluated as follows. The characteristic data stored in the characteristic data memory 16 is selectively output to an image display unit or printer (not shown) to display a waveform on the coordinate plane defined by the distance axis and the received light intensity axis, as shown in FIG. 11. Variations in attenuation value and the presence/absence of a disconnection or the like are checked from the slope of the displayed waveform, local level changes, and the like.

To detect the overall characteristics of the optical multi-fiber cable 1 as a bundle of optical fibers $2_1$ to $2_n$, or evaluate the characteristics of one optical fiber in contrast to the characteristics of the overall transmission line, instead of independently evaluating each of the optical fibers $2_1$ to $2_n$ all the characteristic data stored in the characteristic data memory 16 must be displayed on the same coordinate plane and evaluated.

In tests on optical fibers using the above OTDR, the characteristic data obtained from optical fibers having the same characteristics vary due to variations in the wavelength of an optical pulse and variations in connection loss in the optical path switch 12.

If, therefore, the waveforms of the characteristic data obtained by this OTDR are displayed on the same coordinate plane, the displayed waveforms greatly shift from each other in the vertical direction than the variations of the characteristic data, even though the optical fibers have almost the same characteristics. For this reason, it is very difficult to detect the overall characteristics of the cable and evaluate the characteristics of one optical fiber in contrast to the characteristics of the overall transmission line.

Generally, one transmission line is made by connecting a plurality of optical fibers each having a length of several km.

In this case, amounts of connection losses between fibers greatly vary due to variations in connection points and transmission lines.

Since the variations in connection losses are accumulated in the transmission line having a plurality of connection points, if using optical fibers having the same characteristics, the characteristics of the overall transmission line differ from every transmission lines.

In evaluating a characteristic of a certain connection point in a certain transmission line in the overall transmission line, the characteristic data of the near portion of the certain connection point greatly varies due to accumulating variations in the connection loss and accumulated variations in connection loss in the optical path switch 12.

For this reason it is very difficult to evaluate the characteristic of the certain connection point only.

In recent years, with an increase in the number of optical fibers of the optical fiber cable 1, the OTDR can acquire the characteristics of several ten to several thousand optical fibers. This makes it more difficult to perform evaluation.

BRIEF SUMMARY OF THE INVENTION

It is an object of the present invention to provide an optical fiber characteristic evaluation apparatus which can easily detect the overall characteristics of a cable and evaluate the characteristics of one optical fiber in contrast to characteristics of the overall transmission line by solving the above problems in the prior art.

It is another object of the present invention to provide an optical fiber characteristic evaluation method which can easily detect the overall characteristics of a cable and evaluate the characteristics of one optical fiber in contrast to characteristics of the overall transmission line by solving the above problems in the prior art.

It is still another object of the present invention to provide a computer-readable recording medium on which a computer program is recorded, which is used for an optical fiber characteristic evaluation system which can easily detect the overall characteristics of a cable and evaluate the characteristics of one optical fiber in contrast to characteristics of the overall transmission line by solving the above problems in the prior art.

In order to achieve the above objects, according to an aspect of the present invention, there is provided an optical fiber characteristic evaluation apparatus comprising:

characteristic data storage means for storing a plurality of characteristic data each indicating a change in distance versus characteristic value of an optical fiber, which is obtained by inputting an optical pulse to one end of the optical fiber and detecting an intensity of light returning to the one end as a characteristic value, the characteristic data storage means storing a plurality of characteristic data obtained by measuring one optical fiber a plurality of number of times at time intervals or a plurality of characteristic data obtained by measuring a plurality of optical fibers;

an output unit for displaying waveforms of the plurality of characteristic data;

waveform display control means for causing the output unit to display the waveforms of the plurality of characteristic data on an orthogonal coordinate plane defined by a distance axis and a characteristic value axis;

reference point designation means for designating an arbitrary reference point in the orthogonal coordinate plane;

calculation means for calculating a difference between a characteristic value axis coordinate value of the reference point designated by the reference point designation means and a characteristic value axis coordinate value of each of the characteristic data at a distance axis coordinate value substantially equal to a distance axis coordinate value of the reference point; and offset means for offsetting the characteristic data in a characteristic value axis direction by amounts corresponding to the differences calculated by the calculation means to make waveforms of the characteristic data displayed by the waveform display control means pass through the reference point.

According to another aspect of the present invention, there is provided an optical fiber characteristic evaluation method comprising the steps of:

storing a plurality of characteristic data each indicating a change in distance versus characteristic value of the optical fiber, which is obtained by inputting an optical pulse to one end of an optical fiber and detecting an intensity of light returning to the one end as a characteristic value the plurality of characteristic data being obtained by measuring one optical fiber a plurality of number of times at time intervals or by measuring a plurality of optical fibers;

displaying waveforms of the plurality of characteristic data stored in the storing step;

controlling to display the waveforms of the plurality of characteristic data on an orthogonal coordinate plane defined by a distance axis and a characteristic value axis in the displaying step;

designating an arbitrary reference point within the orthogonal coordinate plane on which the waveforms of the plurality of characteristic data are displayed in the controlling step;

calculating a difference between a characteristic value axis coordinate value of the reference point designated in the designating step and a characteristic value axis coordinate value of each of the characteristic data at a distance axis coordinate value substantially equal to a distance axis coordinate value of the reference point; and offsetting the characteristic data in a characteristic value axis direction by amounts corresponding to the differences calculated in the step of calculating to make waveforms of the characteristic data displayed in the controlling step pass through the reference point.

According to still another aspect of the present invention, an article of manufacture comprising:

a computer-readable recording medium having computer-readable program code means therein to evaluate a plurality of characteristic data obtained by measuring one optical fiber a plurality of number of times at time intervals or by measuring a plurality of optical fibers in evaluating characteristic data each indicating a change in distance versus characteristic value of an optical fiber which is obtained by inputting an optical pulse to one end of the optical fiber and detecting an intensity of light returning from the one end as a characteristic value, the computer-readable program code means comprising:

first computer-readable program means for allowing a computer having an output unit for waveform display to have a function of storing a plurality of characteristic data each indicating a change in distance versus characteristic value of an optical fiber, which is obtained by inputting an optical pulse to one end of the optical fiber and detecting a characteristic value of light returning to the one end;

second computer-readable program means for allowing the computer to have a function of causing the output unit to display waveforms of the plurality of characteristic data on an orthogonal coordinate plane defined by a distance axis and a characteristic value axis;

third computer-readable program means for allowing the computer to have a function of designating an arbitrary reference point within the orthogonal coordinate plane;

fourth computer-readable program means for allowing the computer to have a function of calculating a difference between a characteristic value of the reference point and a characteristic value of each of the plurality of characteristic data at a distance position substantially equal to a distance position of the designated reference point; and fifth computer-readable program means for allowing the computer to have a function of offsetting the plurality of characteristic data in a characteristic value axis direction by amounts corresponding to the calculated differences to make waveforms of the respective characteristic data pass through the reference point.

According to still another aspect of the present invention, there is provided an article of manufacture comprising:

a computer-readable recording medium having computer-readable program code means therein to evaluate a plurality of characteristic data obtained by measuring one optical fiber a plurality of number of times at time intervals or by measuring a plurality of optical fibers in evaluating characteristic data each indicating a change in distance versus characteristic value of an optical fiber which is obtained by inputting an optical pulse to one end of the optical fiber and detecting an intensity of light returning from the one end as a characteristic value, the computer-readable program code mean comprising:

first computer-readable program means for allowing a computer having an output unit for waveform display to have a function of storing a plurality of characteristic data each indicating a change in distance versus characteristic value of an optical fiber, which is obtained by inputting an optical pulse to one end of the optical fiber and detecting a characteristic value of light returning to the one end;

second computer-readable program means for allowing the computer to have a function of causing the output unit to display waveforms of the plurality of characteristic data on an orthogonal coordinate plane defined by a distance axis and a characteristic value axis;

third computer-readable program means for allowing the computer to have a function of designating an arbitrary reference point within the orthogonal coordinate plane;

fourth computer-readable program means for allowing the computer to have a function of calculating a difference between a characteristic value of the reference point and a characteristic value of each of the plurality of characteristic data at a distance position substantially equal to a distance position of the designated reference point; and fifth computer-readable program means for allowing the computer to have a function of offsetting the plurality of characteristic data in a characteristic value axis direction by amounts corresponding to the calculated differences to make waveforms of the respective characteristic data pass through the reference point, wherein the function of designating comprises designating arbitrary characteristic data, of the plurality of characteristic data, as reference characteristic data, and designating an arbitrary distance position, and designates a coordinate point, as the reference point, which is determined by the distance position designated in the step of designating the distance position and a characteristic value of the reference characteristic data at the distance position.

According to further still another aspect of the present invention, there is provided an article of manufacture comprising:

An article of manufacture comprising:

a computer-readable recording medium having computer-readable program code means therein to evaluate a plurality of characteristic data obtained by measuring one optical fiber a plurality of number of times at time intervals or by measuring a plurality of optical fibers in evaluating characteristic data each indicating a change in distance versus characteristic value of an optical fiber which is obtained by inputting an optical pulse to one end of the optical fiber and detecting an intensity of light returning from the one end as a characteristic value, the computer-readable program code means comprising:

first computer-readable program means for allowing a computer having an output unit for waveform display to have a function of storing a plurality of characteristic data each indicating a change in distance versus characteristic value of an optical fiber, which is obtained by inputting an optical pulse to one end of the optical fiber and detecting a characteristic value of light returning to the one end;

second computer-readable program means for allowing the computer to have a function of causing the output unit to display waveforms of the plurality of characteristic data on an orthogonal coordinate plane defined by a distance axis and a characteristic value axis;

third computer-readable program means for allowing the computer to have a function of designating an arbitrary reference point within the orthogonal coordinate plane;

fourth computer-readable program means for allowing the computer to have a function of calculating a difference between a characteristic value of the reference point and a characteristic value of each of the plurality of characteristic data at a distance position substantially equal to a distance position of the designated reference point; and fifth computer-readable program means for allowing the computer to have a function of offsetting the plurality of characteristic data in a characteristic value axis direction by amounts corresponding to the calculated differences to make waveforms of the respective characteristic data pass through the reference point, wherein the function of casing comprises displaying a waveform of the characteristic data designated in the function of designating in distinction from waveforms of other characteristic data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

DETAILED DESCRIPTION OF THE INVENTION

Reference will now be made in detail to the presently preferred embodiments of the invention as illustrated in the accompanying drawings, in which like reference characters designate like or corresponding parts throughout the several drawings.

An optical fiber characteristic evaluation system to which the present invention is applied, and a computer-readable recording medium on which the computer program used for the system is recorded will be briefly described first.

In order to achieve the above objects, the first optical fiber characteristic evaluation apparatus of the present invention comprises:

a characteristic data storage means (34) for storing a plurality of characteristic data each indicating a change in the distance versus characteristic value of an optical fiber, which is obtained by inputting an optical pulse to one end of the optical fiber and detecting the characteristic value of light returning to the one end;

an output unit (32) for displaying waveforms;

a waveform display means (37) for causing the output unit to display the waveforms of the plurality of characteristic data on the orthogonal coordinate plane defined by a distance axis and a characteristic value axis;

a reference point designating means (38–40) for designating an arbitrary reference point within the orthogonal coordinate plane;

a calculating means (42) for calculating the difference between the characteristic value of the reference point designated by the reference point designating means and the characteristic value of each of the plurality of characteristic data at a distance position substantially equal to the distance position of the reference point; and an offset means (35) for offsetting the plurality of characteristic data in the characteristic value axis direction by the amounts corresponding to the differences calculated by the calculating means to make the waveforms of the characteristic data displayed by the waveform display means pass through the reference point.

The second optical fiber characteristic evaluation apparatus of the present invention is characterized in that in the first optical fiber characteristic evaluation apparatus, the reference point designating means includes a reference characteristic data designating means (38) for designating arbitrary characteristic data, of the plurality of characteristic data, as reference characteristic data, and a distance designating means (39) for designating an arbitrary distance position, and designates a coordinate point, as the reference point, determined by the distance position designated by the distance designating means and the characteristic value of the reference characteristic data at the distance position, and the waveform display control means displays the waveform of the characteristic data designated by the reference characteristic data designating means in distinction from the waveforms of other characteristic data.

In addition, on a computer-readable recording medium on which a computer program used in the optical fiber characteristic evaluation system of the present invention is recorded, a program for allowing a computer having an output unit for displaying waveforms to have the following functions is recorded:

the function of storing a plurality of characteristic data each indicating a change in distance versus characteristic value of an optical fiber, which is obtained by inputting an optical pulse to one end of the optical fiber and detecting a characteristic value of light returning to the one end;

the function of causing the output unit to display waveforms of the plurality of characteristic data on the orthogonal coordinate plane defined by a distance axis and a characteristic value axis;

the function of designating an arbitrary reference point within the orthogonal coordinate plane;

the function of calculating the difference between the characteristic value of the reference point and the characteristic value of each of the plurality of characteristic data at a distance position substantially equal to the distance position of the designated reference point; and the function of offsetting the plurality of characteristic data in the characteristic value axis direction by the amounts corresponding to the calculated differences to make the waveforms of the respective characteristic data pass through the reference point.

In addition, on a computer-readable recording medium on which a computer program used in the optical fiber characteristic evaluation system of the present invention is recorded, a program for allowing a computer having an output unit for displaying waveforms to have the following functions is recorded:

the function of storing a plurality of characteristic data each indicating a change in distance versus characteristic value of an optical fiber, which is obtained by inputting an optical pulse to one end of the optical fiber and detecting a characteristic value of light returning to the one end;

the function of causing the output unit to display waveforms of the plurality of characteristic data on the orthogonal coordinate plane defined by a distance axis and a characteristic value axis;

the function of designating arbitrary characteristic data, of the plurality of characteristic data, as reference characteristic data;

the function of allowing the waveform of the designated reference characteristic data of the waveforms displayed by the output unit to be discriminated from the waveforms of remaining characteristic data;

the function of setting a coordinate point, as a reference point, which is determined by the designated distance position and the characteristic value of the reference characteristic data at the distance position;

the function of calculating the difference between the characteristic value of the reference point and a characteristic value of each of the plurality of characteristic data at a distance position almost equal to the set reference point; and the function of offsetting the plurality of characteristic data in the characteristic value axis direction by the amounts corresponding to the calculated differences to make the waveforms of the respective characteristic data pass through the reference point.

An embodiment of the present invention based on the above brief description will be described next with reference to the several views of the accompanying drawing.

Figure 1A:
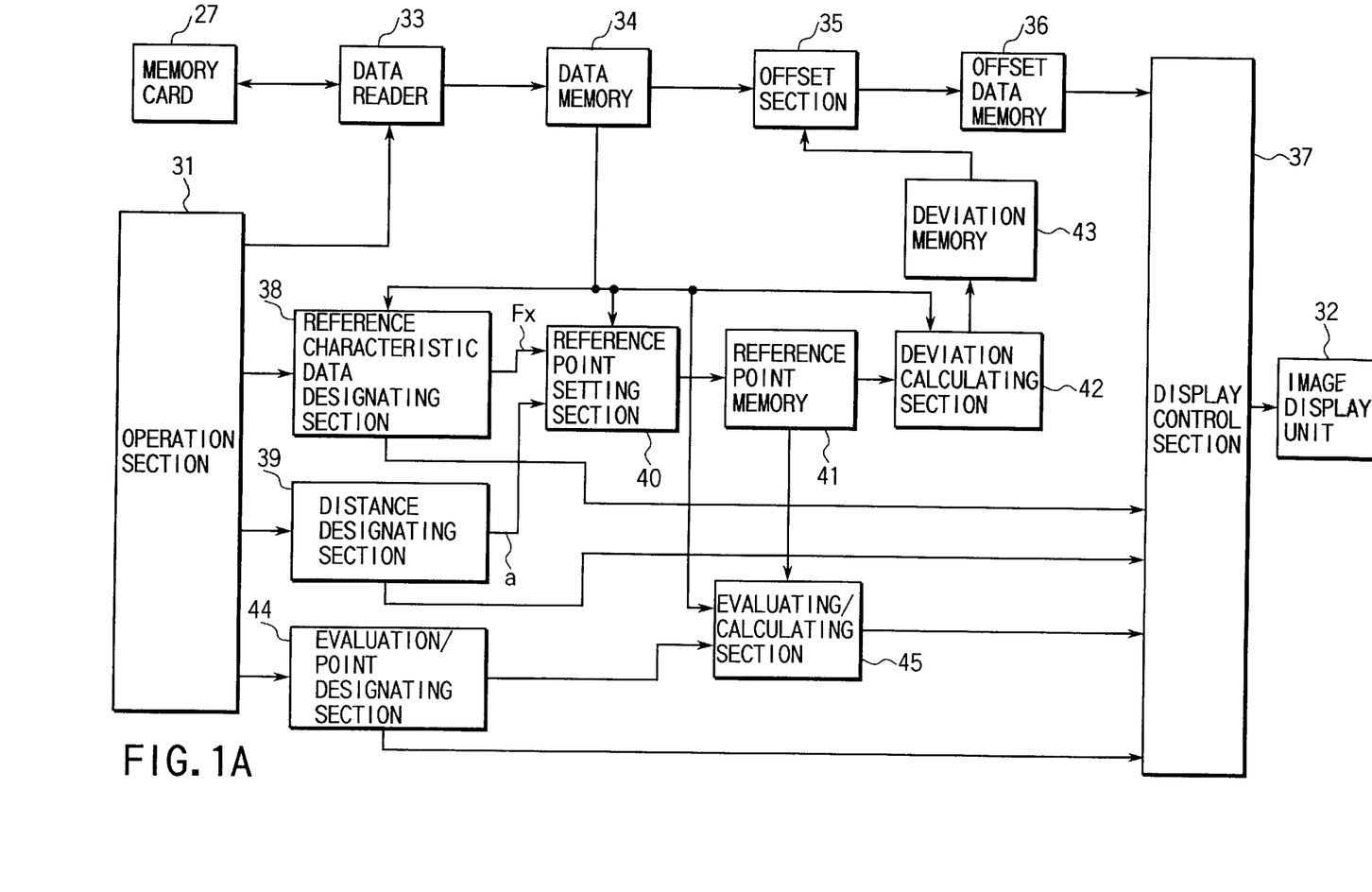
FIG. 1A is a block diagram showing the arrangement of an optical fiber characteristic evaluation system according to an embodiment of the present invention.

FIG. 1A is a block diagram showing the arrangement of an optical fiber characteristic evaluation apparatus according to an embodiment of the present invention.

Figure 1B:
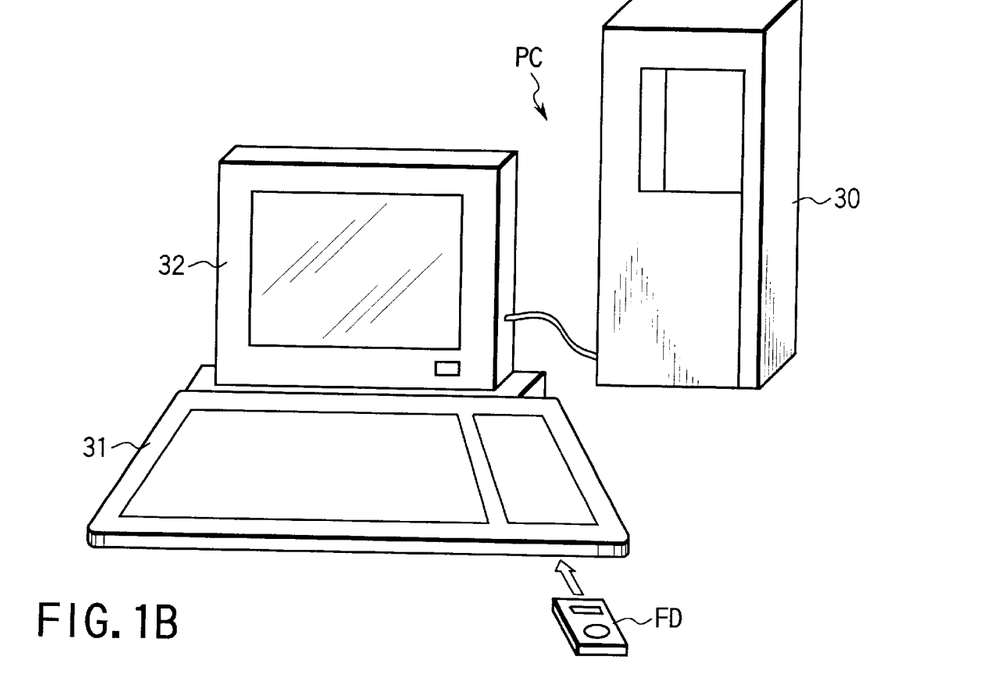
FIG. 1B is a perspective view showing a personal computer to which the optical fiber characteristic evaluation system of the present invention is applied, and a floppy disk as a computer-readable recording medium on which the computer program used in the personal computer is recorded.

FIG. 1B is a perspective view showing a personal computer PC to which the optical fiber characteristic evaluation system of the present invention is applied, and a floppy disk FD as a computer-readable recording medium on which a compute program used for the apparatus is recorded.

Figure 1C:
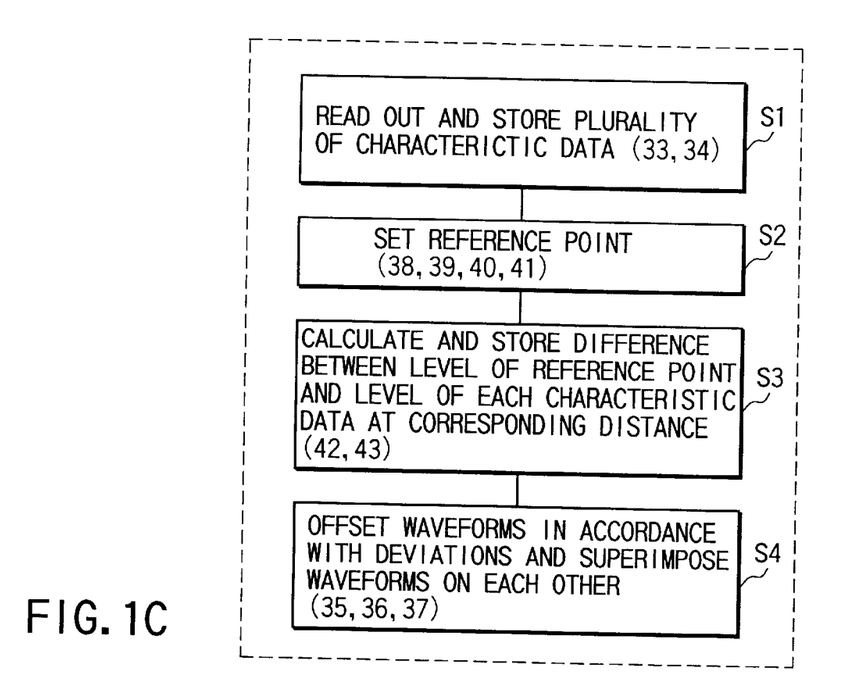
FIG. 1C is a flow chart showing an example of the recorded contents of a computer-readable recording medium on which the computer program used in the optical fiber characteristic evaluation system of the present invention is recorded.

FIG. 1C is a flow chart showing an example of the recorded contents of the computer-readable recording medium on which the computer program used for the optical fiber characteristic evaluation system of the present invention is recorded.

Figure 1D:
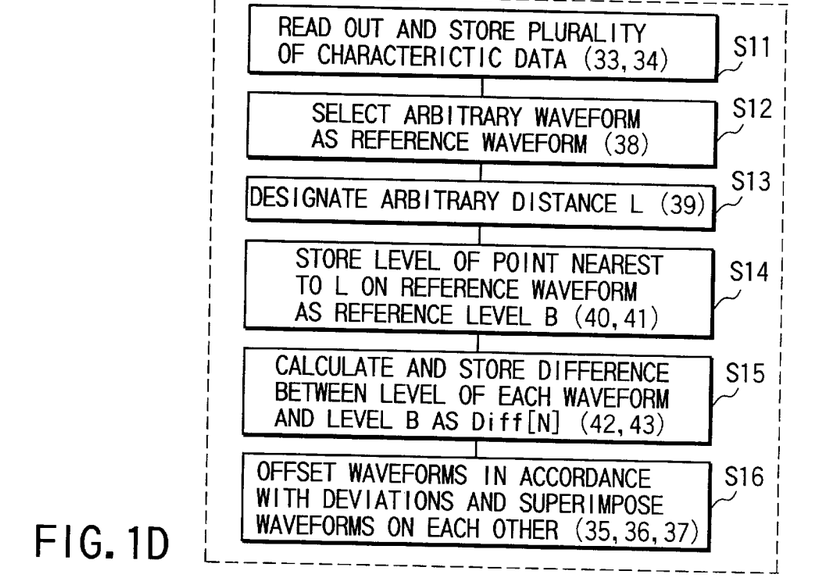
FIG. 1D is a flow chart showing another example of the recorded contents of the computer-readable recording medium on which the computer program used in the optical fiber characteristic evaluation system of the present invention is recorded.

FIG. 1D is a flow chart showing another example of the recorded contents of the computer-readable recording medium on which the computer program used for the optical fiber characteristic evaluation system is recorded.

Figure 1E:
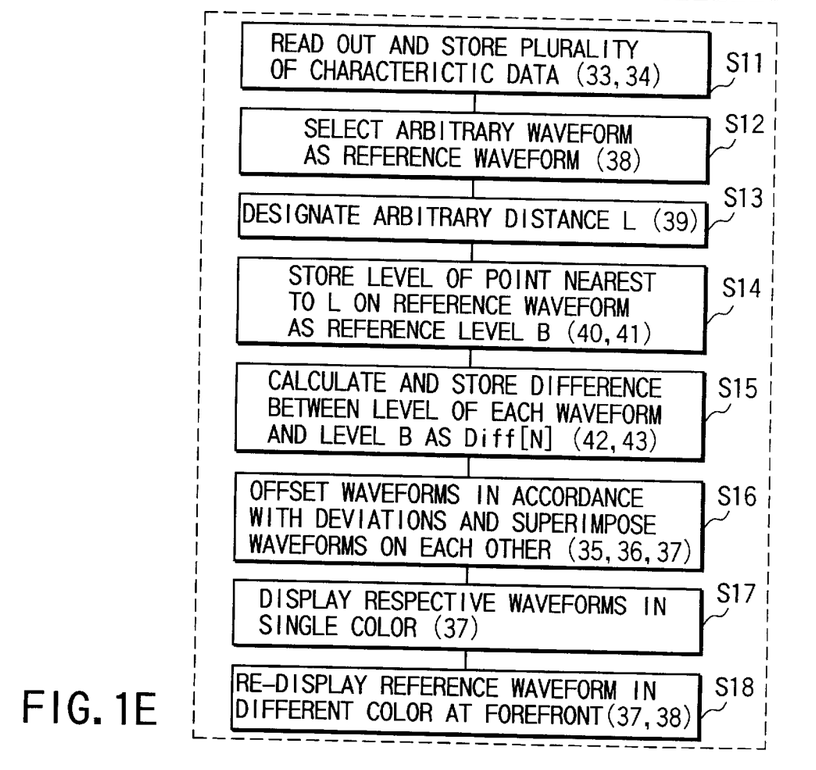
FIG. 1E is a flow chart showing still another example of the recorded contents of the computer-readable recording medium on which the computer program used in the optical fiber characteristic evaluation system of the present invention is recorded.

FIG. 1E is a flow chart showing still another example of the recorded contents of the computer-readable recording medium on which the computer program used for the optical fiber characteristic evaluation system is recorded.

Figure 2:
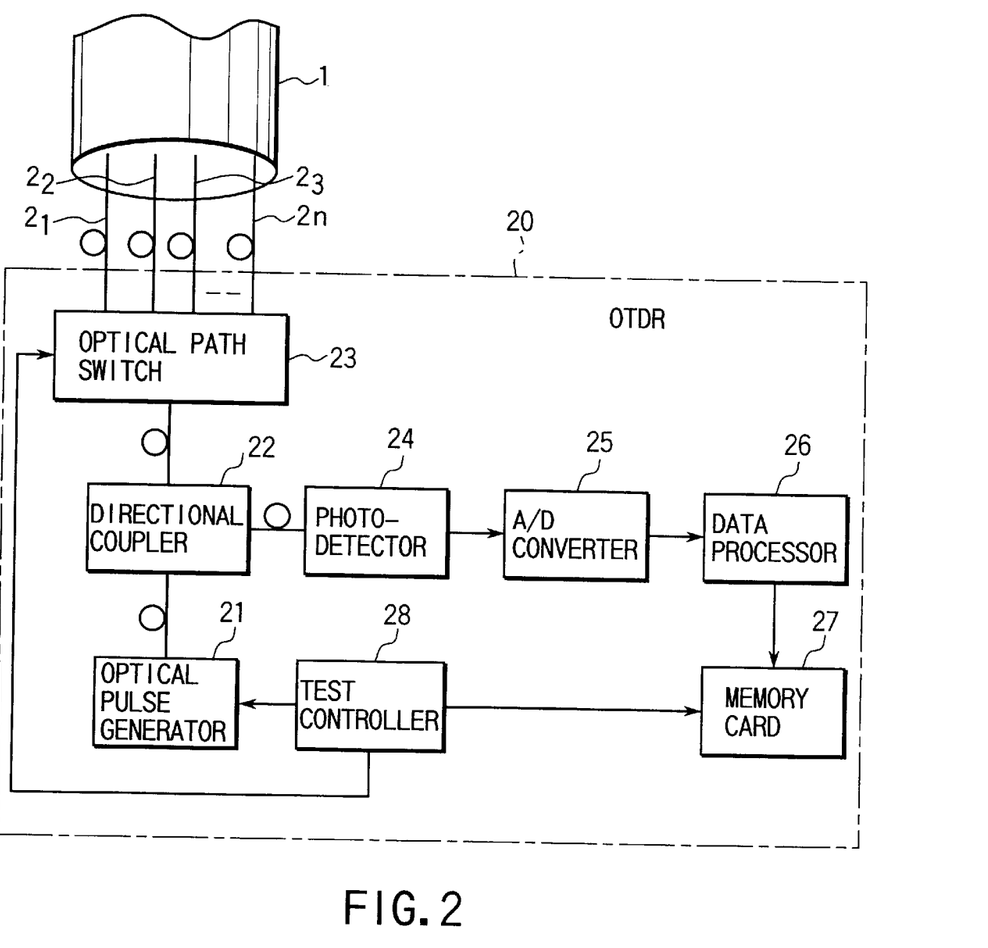
FIG. 2 is a block diagram showing the arrangement of an OTDR used in the optical fiber characteristic evaluation system of the present invention.

FIG. 2 is a block diagram showing the arrangement of an OTDR 20 used for measurement of optical fiber characteristics.

The arrangement of the OTDR 20 will be described first with reference to FIG. 2.

In this OTDR 20, an optical pulse output from an optical pulse generator 21 is guided to an optical path switch 23 through a directional coupler 22. Then, the optical pulse is selectively input to one end of one of optical fibers $2_1$ to $2_n$ of an optical multi-fiber cable 1 connected to the optical path switch 23.

The light returning from one of the optical fibers $2_1$ to $2_n$ to which the optical pulse was incident is input to a photodetector 24 through the directional coupler 22.

The photodetector 24 outputs a photodetection signal whose level changes in accordance with a change in intensity as one of the characteristic values of the return light.

This photodetection signal is converted into a digital data signal by an A/D converter 25. A data processor 26 then performs averaging processing for this signal. The resultant data is stored in a detachable memory card 27 as characteristic data indicating a change in distance versus received light intensity of one optical fiber.

In this case, a test controller 28 causes the optical pulse generator 21 to output an optical pulse to the same optical fiber a number of times required for the above averaging processing. The test controller 28 then stores the resultant characteristic data in the memory card 27, together with a corresponding piece of information $F_1$ to $F_n$ (pieces of file name information or the like) which specifies the optical fiber having the corresponding characteristic, and switches the optical path switch 23 to the optical fiber to be tested next in a predetermined order.

When tests on the respective optical fibers are complete, therefore, distance versus received light intensity characteristic data $D_1$ to $D_n$ of the optical fibers $2_1$ to $2_n$ are stored in the memory card 27, together with the information $F_1$ to $F_n$ of the respective optical fibers.

This memory card 27 is removed from the OTDR 20 and inserted into the optical fiber characteristic evaluation apparatus shown in FIG. 1A.

This arrangement is used to allow the measurement data obtained by the OTDR 20 at the site of an optical fiber cable to be analyzed by a computer installed in a place other than the site.

As shown in FIG. 1B, for example, this optical fiber characteristic evaluation apparatus is made up of a personal computer PC including a tower controller 30 as a personal computer body, an operation unit 31 constituted by a keyboard and a mouse, and an image display unit 32 such as a CRT or liquid crystal display serving as an output unit, and a floppy disk FD that is inserted into the personal computer and serves as a computer-readable recording medium on which a computer program like the one shown in FIGS. 1C to 1E is recorded.

FIG. 1A is a block diagram showing the functions executed by the program loaded from the floppy disk FD (other media such as a magnetooptical disk, a CD-ROM, and IC memory card can also be used) as a computer-readable recording medium into the personal computer PC. However, these functions can be implemented by hardware.

Referring to FIG. 1A, when the memory card 27 is inserted or a specific operation is performed using the operation unit 31 while the memory card 27 is inserted, a data reader 33 reads out data from the memory card 27 and stores the data in a data memory 34 serving as a characteristic data storage means of this embodiment (steps S1 and S11).

An offset section 35 subtracts deviations $d_1$ to $d_n$ corresponding to the respective optical fibers and stored in a deviation memory 43 (to be described later) from the characteristic data $D_1$ to $D_n$ stored in the data memory 34, and stores the subtraction results as offset characteristic data $D_1'$ to $D_n'$ in an offset data memory 36 (steps S3 and S15).

In this case, since all the default values in the deviation memory 43 are 0, the first offset characteristic data $D_1'$ to $D_n'$ stored in the offset data memory 36 are identical to the characteristic data $D_1$ to $D_n$ read out from the memory card 27.

A display control section 37 serves as a waveform display means in this embodiment.

More specifically, the display control section 37 displays an orthogonal coordinate plane on the screen of the image display unit 32, with the abscissa and ordinate respectively representing distance and received light intensity. The display control section 37 displays the waveforms of a plurality of offset characteristic data stored in the offset data memory 36 on this coordinate plane (steps S4 and S16).

Note that this display control section 37 displays the waveform of the characteristic data corresponding to the information selected/designated by a reference characteristic data designating section 38 (to be described later) in a color different from that of the waveforms of the remaining characteristic data.

The reference characteristic data designating section 38 displays, through the display control section 37, a button ("REF. FILE" in FIGS. 3 to 9 to be described later) for displaying the pieces of information $F_1$ to $F_n$ corresponding to the respective characteristic data on the screen of the image display unit 32, and also allows the operator to select/designate one of the pieces of information which corresponds to reference characteristic data upon cursor operation by displaying all the pieces of information $F_1$ to $F_n$ stored in the data reader 33 on the image display unit 32 when this button is operated with the operation unit 31 (step S12).

A distance designating section 39 displays, through the display control section 37, a button ("REF. POSIT" in FIGS.

3 to 9 to be described later) for displaying a reference marker line on the screen of the image display unit 32.

When this button "REF. POSIT" is operated with the operation unit 31, the distance designating section 39 displays the reference marker line in a state movable along the distance axis on the screen, and also allows the operator to designate a distance coordinate a of the reference marker line by confirming operation using the operation unit 31.

A reference point setting section 40 stores/sets a coordinate point [a, $D_x(a)$] as a reference point in a reference point memory 41, which point is determined by a distance a designated by the distance designating section 39 and a received light intensity $D_x(a)$ at the distance a of reference characteristic data $D_x$ corresponding to information $F_x$ selected/designated by the reference characteristic data designating section 38 (step S2).

A deviation calculating section 42 reads out received light intensities $D_1(a), D_2(a), \ldots, D_n(a)$ of the characteristic data stored in the data memory 34 at the distance coordinates a set in the reference point memory 41, and subtracts the received light intensity coordinate $D_x(a)$ set in the reference point memory 41 from each of the received light intensities $D_1(a), D_2(a), \ldots, D_n(a)$ to obtain the subtraction results as the deviations d1 to $d_n$ corresponding to the respective optical fibers.

The deviations $d_1$ to $d_n$ corresponding to the respective optical fibers are stored in the deviation memory 43 (steps S3 and S15).

An evaluation point designating section 44 displays a button ("MES. POSIT" in FIGS. 3 to 9 to be described later) for displaying an evaluation marker line on the screen of the image display unit 32, similar to the distance designating section 39 described above.

When this button "MES. POSIT" is operated with the operation unit 31, the evaluation point designating section 44 displays the evaluation marker line in a state movable along the distance axis, and allows the operator to designate distance coordinates b of the evaluation marker line by confirming operation using the operation unit 31.

An evaluating/calculating section 45 subtracts a received light intensity $D_x(b)$ at a distance b designated by the evaluation point designating section 44 from the received light intensity $D_x(a)$ of the reference point on the reference characteristic data $D_x$ to obtain the attenuation value of an optical fiber $2_x$ from the point at the distance a to the point at the distance b.

The evaluating/calculating section 45 also divides this attenuation value by a distance difference (b−a) to obtain an attenuation value per unit distance (attenuation ratio).

The calculation results obtained by the evaluating/calculating section 45 are displayed on the screen of the image display unit 32 through the display control section 37.

This attenuation ratio corresponds to the slope of the displayed reference characteristic data.

The operation of this optical fiber characteristic evaluation apparatus will be described next with reference to the flow charts of FIGS. 1C to 1E.

First of all, the memory card 27 in which the characteristic data $D_1$ to $D_n$ of the optical fibers $2_1$ to $_2$n tested by the OTDR 20 and the pieces of information $F_1$ to $F_n$ are stored in advance is inserted into this optical fiber characteristic evaluation apparatus.

When the operator performs a specific operation with the operation unit 31 in this state, the data in the memory card 27 is stored in the data memory 34 (steps S11 and S11).

The characteristic data $D_1$ to $D_n$ stored in the data memory 34 are stored in the offset data memory 36 through the offset section 35.

Figure 3:
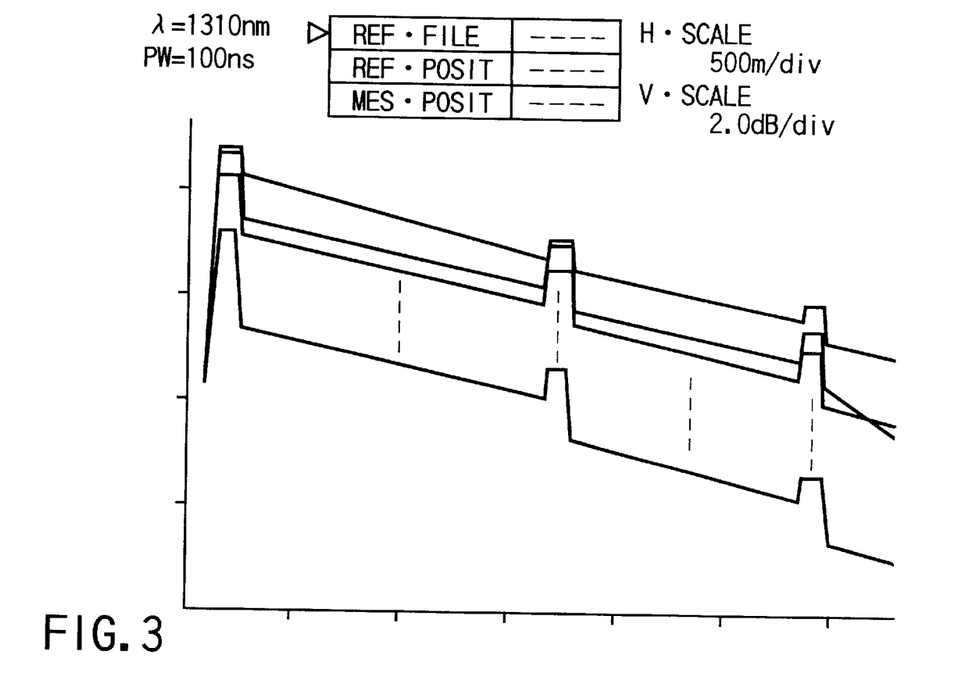
FIG. 3 is a view showing an example of the display screen in the optical fiber characteristic evaluation system of the present invention.

With this operation, for example, as shown in FIG. 3, the waveforms of the characteristic data of the respective optical fibers are displayed in the same color on the screen of the image display unit 32 through the display control section 37, with the displayed waveforms varying vertically owing to variations in the characteristics of the directional coupler 22 of the OTDR 20 and fluctuations in the wavelengths of optical pulses.

Figure 4:
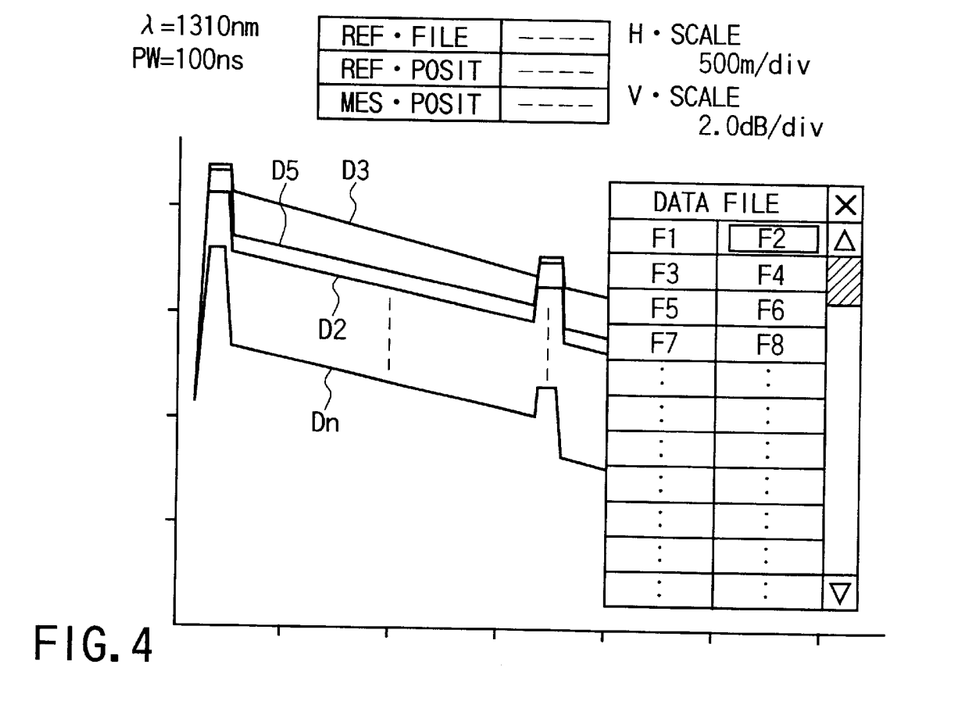
FIG. 4 is a view showing another example of the display screen in the optical fiber characteristic evaluation system of the present invention.

In this case, when the operator operates the button "REF. FILE" for designating specific data as a reference with the operation unit 31, the pieces of information $F_1$ to $F_n$ stored in the data memory 34 (offset data memory 36) are displayed as a list on the screen of the image display unit 32 in the form of a table, for example, as shown in FIG. 4.

Assume that the operator selects/designates the information $F_2$ of the pieces of information $F_1$ to $F_n$ displayed on the screen of the image display unit 32 by operating the operation unit 31.

Figure 5:
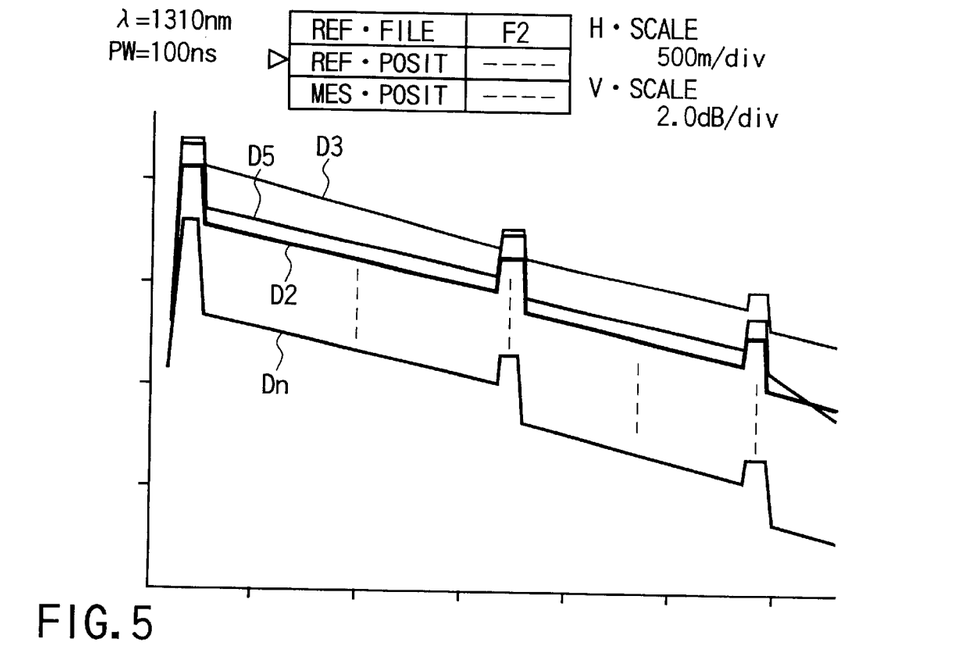
FIG. 5 is a view showing still another example of the display screen in the optical fiber characteristic evaluation system of the present invention.

In this case, as shown in FIG. 5, the color of the waveform (indicated by the thick line in FIG. 5) of the characteristic data $D_2$ corresponding to the information $F_2$ is changed to a color different from that of the remaining waveforms (step S18).

In this case, after the remaining waveforms are displayed in the same color (e.g., yellow), the waveform of the characteristic data $D_2$ is displayed in a different color (e.g., green), and the waveform of the reference characteristic data is re-displayed in a different color at the forefront so as not to be covered with other waveforms (steps S17 and S18).

Assume that the operator operates the button "REF. POSIT" with the operation unit 31 to display the reference marker line on the screen of the image display unit 32.

Figure 6:
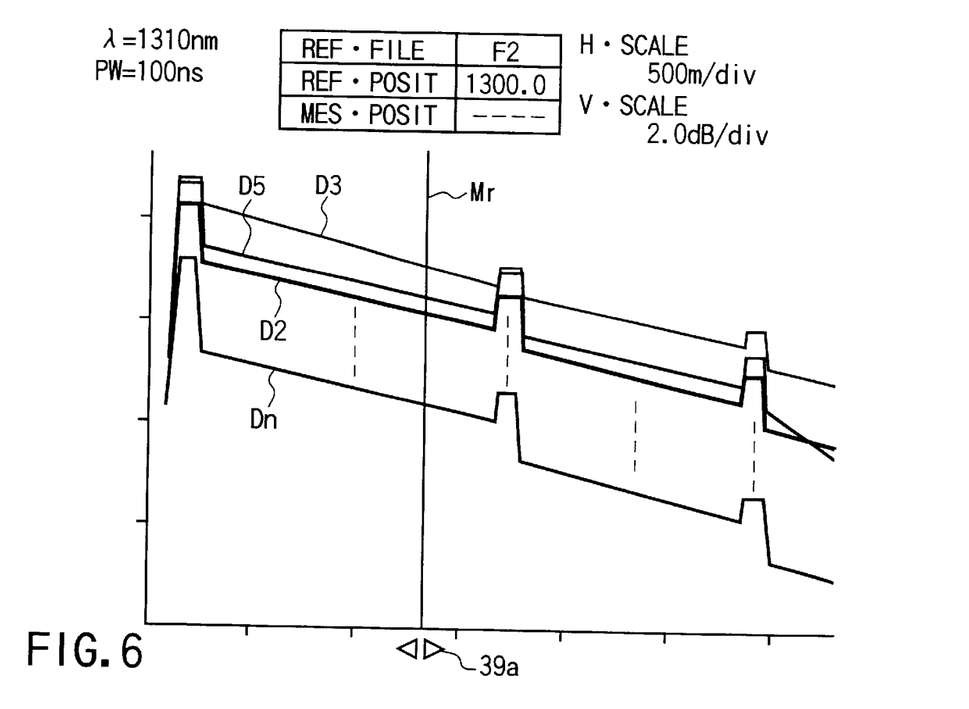
FIG. 6 is a view showing still another example of the display screen in the optical fiber characteristic evaluation system of the present invention.

At this time, as shown in FIG. 6, a movable reference marker line Mr is displayed at a predetermined position.

Subsequently, when the operator performs confirming operation by moving the reference marker line Mr along the distance axis by operating a cursor 39a, the reference point coordinates based on the distance coordinate a of the reference marker line Mr and the received light intensity coordinate $D_2(a)$ of the characteristic data $D_2$ at the distance a are set in the reference point memory 41 (steps S2 and S14).

The results obtained by the deviation calculating section 42 by subtracting the received light intensity $D_2(a)$ from the received light intensities $D_1(a), D_2(a), \ldots, D_n(a)$ of the respective characteristic data at the distance a stored in the data memory 34 are stored as the deviations $d_1$ to $d_n$ in the deviation memory 43 (steps S3 and S15).

In this case, the deviation $d_2$ of the optical fiber 22 which is designated as reference characteristic data is 0.

As a result, offset characteristic data $D_1'(=D_1-d_1), D_2'(=D_2-d_2), \ldots, D_n'(=D_n - d_n)$ obtained by the offset section 35 by subtracting the deviations $d_1$ to $d_n$ from the first characteristic data $D_1, D_2, \ldots, D_n$ read out the memory card 27 are stored in the offset data memory 36 in place of the characteristic data $D_1, D_2, \ldots, D_n$.

Note that, however, since $d_2=0$ the characteristic data $D_2'$ is identical to the characteristic data $D_2$.

Figure 7:
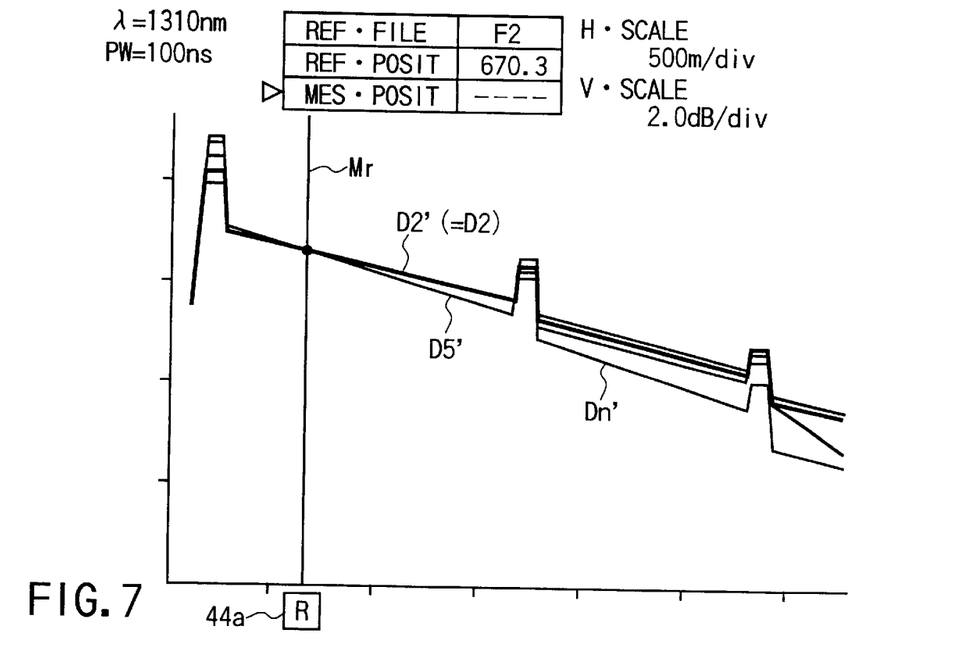
FIG. 7 is a view showing still another example of the display screen in the optical fiber characteristic evaluation system of the present invention.

With this offset operation, the waveforms of all the characteristic data displayed on the screen of the image display unit 32 pass through a reference point on the characteristic data serving as a reference, as shown in FIG. 7.

Of the waveforms of the characteristic data displayed on the screen of the image display unit 32, therefore, the waveforms of characteristic data whose transmission characteristics are almost the same as those of the reference characteristic data are superimposed on the waveform of the reference characteristic data (steps S4 and S16) as shown in FIG. 7.

The waveforms of characteristic data different in attenuation ratio or the like from the reference characteristic data are displayed apart from the reference waveform.

With the display of these waveforms, the operator can grasp the differences in loss characteristics as the main characteristics of optical fibers between the respective optical fibers at a glance.

Figure 8:
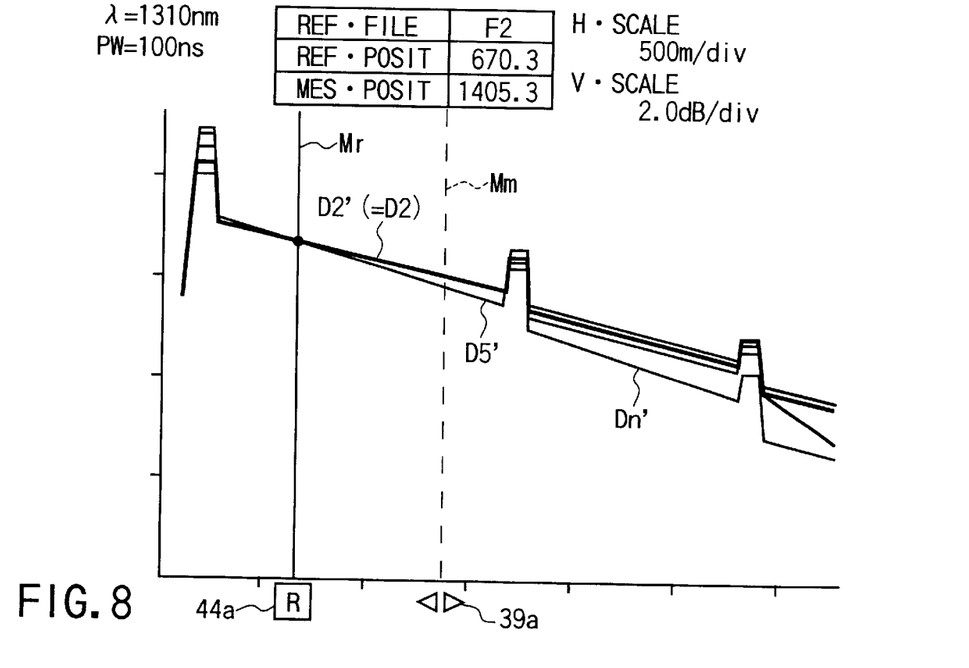
FIG. 8 is a view showing still another example of the display screen in the optical fiber characteristic evaluation system of the present invention.

When the operator operates the button "MES. POSIT" with the operation unit 31 to display an evaluation marker line, a movable evaluation marker line Mm is displayed on the screen of the image display unit 32, as shown in FIG. 8.

Assume that the operator moves the evaluation marker line Mm to an arbitrary position along the distance axis by operating a cursor 44a, and then performs confirming operation by operating the operation unit 31.

In this case, the evaluation point designating section 44 obtains a received light intensity coordinate $D_2(b)$ of the characteristic data $D_2$ at a distance coordinate b of the evaluation marker line Mm, and also calculates the attenuation value and ratio between the point at the distance a and the point at the distance b.

Figure 9:
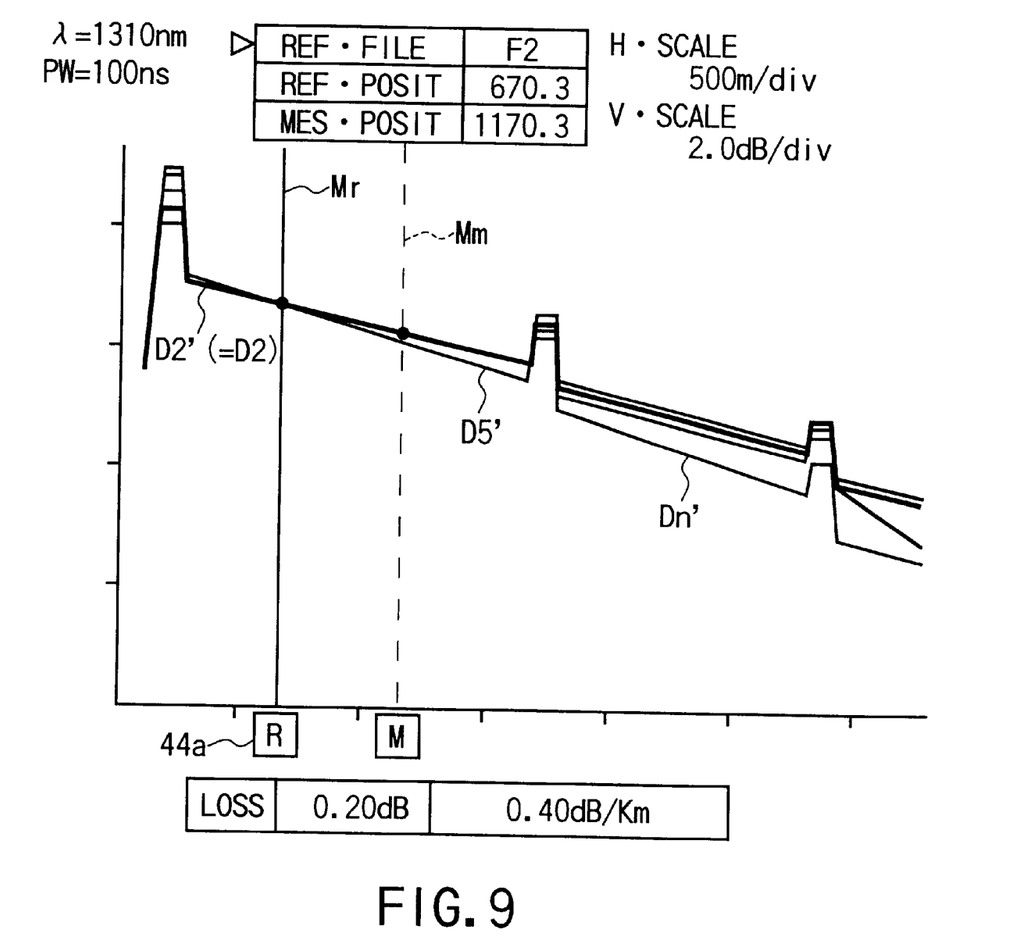
FIG. 9 is a view showing still another example of the display screen in the optical fiber characteristic evaluation system of the present invention.

The attenuation value and ratio between the point at the distance a and the point at the distance b are displayed, for example, like "LOSS 0.20 dB, 0.40 dB/Km" on the screen of the image display unit 32 through the display control section 37, as shown in FIG. 9.

Note that the reference characteristic data can be changed by operating the button "REF. FILE" again.

In addition, the positions of the reference marker line Mr and the evaluation marker line Mm can be changed by operating the button "REF. POSIT" and the button "MES. POSIT" or directly operating the reference marker line Mr and the evaluation marker line Mm with the mouse cursor.

According to the above description, the characteristic data read out from the memory card 27 are stored in the offset data memory 36 as well as the data memory 34, and the waveforms of the characteristic data without offset processing are displayed on the screen of the image display unit 32.

However, after the characteristic data read out from the memory card 27 are stored in the data memory 34, the information $F_x$ and the distance a corresponding to reference characteristic data may be designated to cause the deviation calculating section 42 to calculate the deviations from the reference point in units of characteristic data. In addition, the characteristic data may be stored in the offset data memory 36 after the offset section 35 performs offset processing for the characteristic data in the data memory 34 by using the calculated deviations.

In this case, the waveforms of the characteristic data having undergone offset processing can be displayed from the beginning.

If the overall apparatus or at least the contents of the deviation memory 43 can be reset by a specific operation using the operation unit 31, the displayed waveforms can be restored to the waveforms of the initial characteristic data before offset processing.

As described above, the optical fiber characteristic evaluation apparatus of this embodiment performs offset processing for the characteristic data of optical fibers, which are obtained in the presence of variations in optical pulse wavelength and variations in the loss of the optical path switch, so as to display the waveforms of the respective characteristic data such that the waveforms pass through a reference point.

According to the optical fiber characteristic evaluation apparatus of this embodiment, therefore, the waveforms of characteristic data exhibiting similar transmission characteristics are superimposed on each other, whereas the waveforms of characteristic data exhibiting different transmission characteristics are displayed apart from each other. This allows the operator to accurately grasp the overall characteristics of the optical fiber cable 1.

In addition, the optical fiber characteristic evaluation apparatus of this embodiment displays the waveform of characteristic data designated as a reference in a color different from that of the remaining waveforms so as to be identified.

According to the optical fiber characteristic evaluation apparatus of this embodiment, therefore, the characteristic of one optical fiber can be easily recognized among the characteristics of the overall optical fiber cable. This facilitates evaluation of the optical fiber.

Another Embodiment

The above embodiment uses the image display unit 32 as an output unit for displaying the waveforms of characteristic data.

Instead of this unit or in addition to this unit, a printer or plotter (not shown) may be used to print out the waveforms of characteristic data.

In the above embodiment, a plurality of characteristic data are read out from the memory card 27 and input to the apparatus.

Instead of this memory card, other types: of recording media may be used. For example, characteristic data may be read out from a floppy disk, a detachable hard disk, or a magnetooptical disk and input to the apparatus.

In addition, a communication unit may be placed between this optical fiber characteristic evaluation apparatus and an OTDR 20 to allow the optical fiber characteristic evaluation apparatus to receive a plurality of characteristic data transmitted from the OTDR 20. The characteristic data may be input to the apparatus in this manner.

In the above embodiment, the data stored in the memory card 27 is temporarily loaded into the data memory 34 to be subjected to offset processing in the offset section 35.

Instead of this operation, an offset section 35 may directly perform offset processing for the data read out from a memory card 27 and may write the resultant data in an offset data memory 36.

In this case, therefore, the memory card 27 itself serves as a characteristic data storage means.

The optical fiber characteristic evaluation apparatus of the above embodiment is formed independently of the OTDR 20 to allow the characteristic data obtained at the site of optical fibers to be evaluated in a different place.

However, the optical fiber characteristic evaluation apparatus may be integrally formed with the OTDR 20.

In this case, a storage medium used to store characteristic data need not be detachable.

In this embodiment, of a plurality of characteristic data, the coordinates of a reference point are set on arbitrarily selected characteristic data.

Instead of this operation, the coordinates of an arbitrary reference point may be input by operating an operation unit 31 regardless of characteristic data, and the differences between the received light intensities of the respective characteristic data at the distance position of the set reference point and the received light intensity of the reference point may be calculated. Then, the respective characteristic data may be offset in the received light intensity axis direction by the amounts corresponding to the calculated differences so as to display the waveforms of the characteristic data such that all the waveforms pass through the reference point.

In this case as well, if the waveform of the arbitrarily designated characteristic data is displayed in a color different from that of the waveforms of the remaining characteristic data, the characteristics of the specific optical fiber among the overall characteristics of the optical fibers can be easily identified.

In the above embodiment, deviations are calculated in units of optical fibers from the received light intensities $D_1(a), D_2(a), \ldots, D_n(a)$ of the respective characteristic data at the designated distance a.

However, since the distance values of characteristic data are not continuous depending on the sampling intervals in data acquisition, the received light intensities of the characteristic data corresponding to an arbitrarily set distance a may not be obtained.

In this case, the received light intensities nearest to the point at the designated distance a may be used, or the average of a plurality of received light intensities near the point at the distance a may be obtained for each characteristic data, and the differences between the respective averages and the received light intensity of the reference point may be calculated to perform offset processing (steps S13, S14, and S15).

In the above embodiment, the characteristic data of the distance versus received light intensities obtained by detecting the intensities of light beams returning from optical fibers as characteristic values are calculated.

However, the present invention is not limited to this. For example, the present invention can be applied to evaluation of characteristic data indicating changes in distance versus characteristic value which are obtained by detecting the angles of planes of polarization of returning light beams, the frequencies or the like of sideband light beams which are produced by the Doppler effect, or the like as characteristic values.

As has been described above, the optical fiber characteristic evaluation apparatus of the present invention obtains the differences between characteristic data of the reference point arbitrarily designated by the reference point designating means and a plurality of characteristic data at the distance value of this reference point, and offsets the characteristic values of the characteristic data by the amounts corresponding to the differences, thereby displaying the waveforms of the plurality of characteristic data such that the waveforms pass through the reference point on the orthogonal coordinate plane defined by the distance axis and the characteristic value axis.

According to the optical fiber characteristic evaluation apparatus of the present invention, therefore, even with the characteristic data of a plurality of optical fibers which are obtained in the presence of variations in optical pulse wavelength, variations in the loss of the optical path switch, and the like, the overall characteristics of the optical fibers can be accurately detected.

In addition, the optical fiber characteristic evaluation apparatus of the present invention designates characteristic data as a reference and a reference point on the characteristic data, and displays the waveform of the reference characteristic data such that the waveform can be discriminated from the remaining waveforms.

According to the optical fiber characteristic evaluation apparatus of the present invention, therefore, a specific optical fiber of a plurality of optical fibers can be easily evaluated.

As has been described in detail above, according to the present invention, there is provided an optical fiber characteristic evaluation apparatus which can solve the above problems in the prior art, and can easily detect the overall characteristics of a cable and evaluate the characteristics of one optical fiber in all overall transmission lines.

In addition, according to the present invention, there is provided an optical fiber characteristic evaluation method which can solve the above problems in the prior art, and can easily detect the overall characteristics of a cable and evaluate the characteristics of one optical fiber in contrast to characteristics of the overall transmission line.

Furthermore, according to the present invention, there is provided a computer-readable recording medium on which a computer program is recorded, which is used for an optical fiber characteristic evaluation system which can solve the above problems in the prior art, and can easily detect the overall characteristics of a cable and evaluate the characteristics of one optical fiber in contrast to characteristics of the overall transmission line.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical fiber characteristic evaluation apparatus comprising:

characteristic data storage means for storing a plurality of characteristic data each indicating a change in distance versus characteristic value of an optical fiber, which is obtained by inputting an optical pulse to one end of the optical fiber and detecting an intensity of light returning to said one end as a characteristic value, said characteristic data storage means storing a plurality of characteristic data obtained by measuring one optical fiber a plurality of number of times at time intervals or a plurality of characteristic data obtained by measuring a plurality of optical fibers;

an output unit for displaying waveforms of the plurality of characteristic data;

waveform display control means for causing said output unit to display the waveforms of the plurality of characteristic data on an orthogonal coordinate plane defined by a distance axis and a characteristic value axis;

reference point designating means for designating an arbitrary reference point within the orthogonal coordinate plane;

calculating means for calculating a difference between a characteristic value axis coordinate value of the reference point designated by said reference point designating means and a characteristic value axis coordinate value of each of the characteristic data at a distance axis coordinate value substantially equal to a distance axis coordinate value of the reference point; and offset means for offsetting the characteristic data in a characteristic value axis direction by amounts corresponding to the differences calculated by said calculating means to make waveforms of the characteristic data displayed by said waveform display control means pass through the reference point.

2. An apparatus according to claim 1, wherein said reference point designating means includes reference characteristic data designating means for designating arbitrary characteristic data, of the plurality of characteristic data, as reference characteristic data, and distance designating means for designating an arbitrary distance position, and designates a coordinate point, as the reference point, determined by the distance position designated by said distance designating means and a characteristic value of the reference characteristic data at the distance position.

3. An apparatus according to claim 1, wherein said waveform display control means displays a waveform of the characteristic data designated by said reference characteristic data designating means in distinction from waveforms of other characteristic data.

4. An optical fiber characteristic evaluation method comprising the steps of:
   storing a plurality of characteristic data each indicating a change in distance versus characteristic value of the optical fiber, which is obtained by inputting an optical pulse to one end of an optical fiber and detecting an intensity of light returning to said one end as a characteristic value the plurality of characteristic data being obtained by measuring one optical fiber a plurality of number of times at time intervals or by measuring a plurality of optical fibers;
   displaying waveforms of the plurality of characteristic data stored in the storing step;
   controlling to display the waveforms of the plurality of characteristic data on an orthogonal coordinate plane defined by a distance axis and a characteristic value axis in the displaying step;
   designating an arbitrary reference point within the orthogonal coordinate plane on which the waveforms of the plurality of characteristic data are displayed in the controlling step;
   calculating a difference between a characteristic value axis coordinate value of the reference point designated in the designating step and a characteristic value axis coordinate value of each of the characteristic data at a distance axis coordinate value substantially equal to a distance axis coordinate value of the reference point; and
   offsetting the characteristic data in a characteristic value axis direction by amounts corresponding to the differences calculated in the step of calculating to make waveforms of the characteristic data displayed in the controlling step pass through the reference point.

5. A method according to claim 4, wherein the designating step comprises the steps of designating arbitrary characteristic data, of the plurality of characteristic data, as reference characteristic data, and designating an arbitrary distance position, and designates a coordinate point, as the reference point, which is determined by the distance position designated in the step of designating the distance position and a characteristic value of the reference characteristic data at the distance position.

6. A method according to claim 4, wherein the controlling step comprises displaying a waveform of the characteristic data designated in the designating step in distinction from waveforms of other characteristic data.

7. An article of manufacture comprising:
   a computer-readable recording medium having computer-readable program code means therein to evaluate a plurality of characteristic data obtained by measuring one optical fiber a plurality of number of times at time intervals or by measuring a plurality of optical fibers in evaluating characteristic data each indicating a change in distance versus characteristic value of an optical fiber which is obtained by inputting an optical pulse to one end of the optical fiber and detecting an intensity of light returning from said one end as a characteristic value, said computer-readable program code means comprising:
   first computer-readable program means for allowing a computer having an output unit for waveform display to have a function of storing a plurality of characteristic data each indicating a change in distance versus characteristic value of an optical fiber, which is obtained by inputting an optical pulse to one end of the optical fiber and detecting a characteristic value of light returning to said one end;
   second computer-readable program means for allowing said computer to have a function of causing said output unit to display waveforms of the plurality of characteristic data on an orthogonal coordinate plane defined by a distance axis and a characteristic value axis;
   third computer-readable program means for allowing said computer to have a function of designating an arbitrary reference point within the orthogonal coordinate plane;
   fourth computer-readable program means for allowing said computer to have a function of calculating a difference between a characteristic value of the reference point and a characteristic value of each of the plurality of characteristic data at a distance position substantially equal to a distance position of the designated reference point; and
   fifth computer-readable program means for allowing said computer to have a function of offsetting the plurality of characteristic data in a characteristic value axis direction by amounts corresponding to the calculated differences to make waveforms of the respective characteristic data pass through the reference point.

8. An article of manufacture comprising:
   a computer-readable recording medium having computer-readable program code means therein to evaluate a plurality of characteristic data obtained by measuring one optical fiber a plurality of number of times at time intervals or by measuring a plurality of optical fibers in evaluating characteristic data each indicating a change in distance versus characteristic value of an optical fiber which is obtained by inputting an optical pulse to one end of the optical fiber and detecting an intensity of light returning from said one end as a characteristic value, said computer-readable program code mean comprising:
   first computer-readable program means for allowing a computer having an output unit for waveform display to have a function of storing a plurality of characteristic data each indicating a change in distance versus characteristic value of an optical fiber, which is obtained by inputting an optical pulse to one end of the optical fiber and detecting a characteristic value of light returning to said one end;
   second computer-readable program means for allowing said computer to have a function of causing said output unit to display waveforms of the plurality of characteristic data on an orthogonal coordinate plane defined by a distance axis and a characteristic value axis;
   third computer-readable program means for allowing said computer to have a function of designating an arbitrary reference point within the orthogonal coordinate plane;
   fourth computer-readable program means for allowing said computer to have a function of calculating a difference between a characteristic value of the reference point and a characteristic value of each of the plurality of characteristic data at a distance position substantially equal to a distance position of the designated reference point; and fifth computer-readable program means for allowing said computer to have a function of offsetting the plurality of characteristic data in a characteristic value axis direction by amounts corresponding to the calculated differences to make waveforms of the respective characteristic data pass through the reference point, wherein the function of designating comprises designating arbitrary characteristic data, of the plurality of characteristic data, as reference characteristic data, and designating an arbitrary distance position, and designates a coordinate point, as the reference point, which is determined by the distance position designated in the step of designating the distance position and a characteristic value of the reference characteristic data at the distance position.

9. An article of manufacture comprising:

a computer-readable recording medium having computer-readable program code means therein to evaluate a plurality of characteristic data obtained by measuring one optical fiber a plurality of number of times at time intervals or by measuring a plurality of optical fibers in evaluating characteristic data each indicating a change in distance versus characteristic value of an optical fiber which is obtained by inputting an optical pulse to one end of the optical fiber and detecting an intensity of light returning from said one end as a characteristic value, said computer-readable program code means comprising:

first computer-readable program means for allowing a computer having an output unit for waveform display to have a function of storing a plurality of characteristic data each indicating a change in distance versus characteristic value of an optical fiber, which is obtained by inputting an optical pulse to one end of the optical fiber and detecting a characteristic value of light returning to said one end;

second computer-readable program means for allowing said computer to have a function of causing said output unit to display waveforms of the plurality of characteristic data on an orthogonal coordinate plane defined by a distance axis and a characteristic value axis;

third computer-readable program means for allowing said computer to have a function of designating an arbitrary reference point within the orthogonal coordinate plane;

fourth computer-readable program means for allowing said computer to have a function of calculating a difference between a characteristic value of the reference point and a characteristic value of each of the plurality of characteristic data at a distance position substantially equal to a distance position of the designated reference point; and fifth computer-readable program means for allowing said computer to have a function of offsetting the plurality of characteristic data in a characteristic value axis direction by amounts corresponding to the calculated differences to make waveforms of the respective characteristic data pass through the reference point, wherein the function of casing comprises displaying a waveform of the characteristic data designated in the function of designating in distinction from waveforms of other characteristic data.

* * * * *